United States Patent
Takemura

(10) Patent No.: US 8,090,505 B2
(45) Date of Patent: Jan. 3, 2012

(54) VEHICLE SEAT BELT APPARATUS

(75) Inventor: Naotoshi Takemura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1062 days.

(21) Appl. No.: 11/950,874

(22) Filed: Dec. 5, 2007

(65) Prior Publication Data

US 2008/0319617 A1 Dec. 25, 2008

(30) Foreign Application Priority Data

Dec. 6, 2006 (JP) .................................. 2006-329740

(51) Int. Cl.
*B60R 22/00* (2006.01)

(52) U.S. Cl. ........ 701/46; 180/268; 180/282; 280/801.1; 280/806

(58) Field of Classification Search .................... 701/45, 701/46; 280/801.1, 806, 808; 200/61.58 B; 242/180, 200, 280, 383; 297/468, 475, 478, 297/480; 180/268, 282

See application file for complete search history.

(56) References Cited

U.S. PATENT DOCUMENTS

| | | | | |
|---|---|---|---|---|
| 3,838,746 A * | 10/1974 | Andres | ......................... | 180/268 |
| 4,949,995 A * | 8/1990 | Haland et al. | ................. | 280/805 |
| 5,899,949 A * | 5/1999 | Kincaid | ........................... | 701/45 |
| 5,913,538 A * | 6/1999 | Herpich | ........................ | 280/805 |
| 6,145,881 A * | 11/2000 | Miller et al. | .................. | 280/806 |
| 6,394,495 B1 * | 5/2002 | Specht | ........................... | 280/806 |
| 7,128,343 B2 * | 10/2006 | Ingemarsson | ................ | 280/805 |
| 7,333,023 B2 * | 2/2008 | Murad et al. | .................. | 340/667 |
| 7,469,928 B2 * | 12/2008 | Clute | .......................... | 280/801.2 |
| 7,692,534 B2 * | 4/2010 | Kataoka et al. | ............... | 340/435 |
| 2001/0054816 A1 * | 12/2001 | Brambilla et al. | ............ | 280/806 |
| 2002/0014767 A1 * | 2/2002 | Class et al. | .................... | 280/807 |
| 2002/0024211 A1 * | 2/2002 | Yano et al. | .................... | 280/806 |
| 2002/0134877 A1 * | 9/2002 | Glinka | ........................ | 242/379.1 |
| 2002/0166914 A1 * | 11/2002 | Specht | .......................... | 242/374 |
| 2003/0209900 A1 * | 11/2003 | Tobata | ......................... | 280/807 |
| 2003/0226409 A1 * | 12/2003 | Steele et al. | ............. | 73/862.391 |
| 2004/0040393 A1 * | 3/2004 | Specht et al. | ............ | 73/862.391 |
| 2004/0041054 A1 * | 3/2004 | Singer | ........................ | 242/379.1 |
| 2004/0084890 A1 * | 5/2004 | Tobata | ......................... | 280/806 |
| 2004/0195030 A1 * | 10/2004 | Eberle et al. | .................. | 180/271 |
| 2004/0251366 A1 * | 12/2004 | Hishon et al. | .............. | 242/390.8 |

(Continued)

FOREIGN PATENT DOCUMENTS

JP 2001-122081 5/2001

(Continued)

*Primary Examiner* — Thomas Black
*Assistant Examiner* — Sze-Hon Kong
(74) *Attorney, Agent, or Firm* — Rankin, Hill & Clark LLP

(57) ABSTRACT

Vehicle seat belt apparatus includes: a motor for driving a belt reel having a belt wound thereon; a trigger section for detecting a change in a traveling state of a vehicle to output an activation signal that instructs or triggers activation of the motor; a lateral acceleration detection section for detecting lateral acceleration acting on the vehicle; a slip state detection section for detecting a slip state quantity of the vehicle; and a control section for, in response to receipt of the activation signal from the trigger section, controlling the amount of current supply for activating the motor on the basis of a signal of the lateral acceleration output by the lateral acceleration detection section and/or a signal of the slip state quantity output by the slip state detection section.

11 Claims, 12 Drawing Sheets

U.S. PATENT DOCUMENTS

| | | | |
|---|---|---|---|
| 2004/0256511 A1* | 12/2004 | Klingauf et al. | 242/379.1 |
| 2005/0012320 A1* | 1/2005 | Tobata | 280/806 |
| 2005/0029382 A1* | 2/2005 | Inuzuka et al. | 242/390.9 |
| 2005/0062277 A1* | 3/2005 | Stanley et al. | 280/808 |
| 2005/0139408 A1* | 6/2005 | Bullinger et al. | 180/268 |
| 2005/0146128 A1* | 7/2005 | Midorikawa et al. | 280/807 |
| 2005/0253012 A1* | 11/2005 | Tanaka et al. | 242/390.9 |
| 2006/0065771 A1* | 3/2006 | Takao et al. | 242/374 |
| 2006/0082128 A1* | 4/2006 | Clute | 280/807 |
| 2006/0091252 A1* | 5/2006 | Biller et al. | 242/381 |
| 2006/0097504 A1* | 5/2006 | Akaba et al. | 280/806 |
| 2006/0255574 A1* | 11/2006 | Ingemarsson et al. | 280/735 |
| 2007/0023558 A1* | 2/2007 | Humbert | 242/382 |
| 2007/0085319 A1* | 4/2007 | Scherzinger et al. | 280/806 |
| 2007/0194565 A1* | 8/2007 | Clute | 280/806 |
| 2007/0284174 A1* | 12/2007 | Odate et al. | 180/268 |
| 2007/0284869 A1* | 12/2007 | Midorikawa | 280/802 |
| 2008/0033616 A1* | 2/2008 | Gillet | 701/45 |
| 2011/0153165 A1* | 6/2011 | Bolton et al. | 701/45 |

FOREIGN PATENT DOCUMENTS

| | | |
|---|---|---|
| JP | 2005-035485 | 2/2005 |
| WO | 2006/107260 | 10/2006 |
| WO | 2006/122742 | 11/2006 |

* cited by examiner

VEHICLE SEAT BELT APPARATUS

FIELD OF THE INVENTION

The present invention relates generally to vehicle seat belt apparatus, and more particularly to an improved vehicle seat belt apparatus which can optimize a belt take-up amount by being triggered in response to vehicle-behavior stabilization control operation of a VSA system or unit or a rapid steering operation detection signal from a steering angle sensor.

BACKGROUND OF THE INVENTION

In the field of the vehicle seat belt apparatus designed to protect a vehicle occupant in a vehicle seat, there has been used in recent years a technique for, in an emergency or during unstable travel of the vehicle, holding or restraining a vehicle occupant by means of a seat belt to thereby restrict a posture change of the vehicle occupant. In such vehicle seat belt apparatus, a motor is timely driven by an electric-type pretensioner so that a belt reel is rotated to take up the seat belt and thereby protectively restrain a vehicle occupant and restrict a posture change of the vehicle occupant.

Further, in recent years, there has been proposed a Vehicle Stability Assist (VSA) system for use with a vehicle. The VSA is a vehicle-behavior stabilization control system which comprises a combination of an Anti-lock Braking System (ABS), Traction Control System (TCS) and vehicle side slip prevention system. "Vehicle side slip" is a traveling state in which a vehicle is turning beyond turning performance of its road wheels, and it is, for example, an oversteer or understeer condition occurring during turning travel of the vehicle.

When an oversteer condition occurs during turning travel of the vehicle, the VSA system calculates a target yaw rate, intended by a driver, on the basis of lateral acceleration, steering angle and vehicle velocity and then performs oversteer control for braking an outer ("outer" as viewed in the turning direction of the vehicle) front road wheel to reduce an actual yaw rate, because the actual yaw rate is greater than the target yaw rate. Further, when an understeer condition occurs due to acceleration during turning travel of the vehicle, the VSA system calculates a target yaw rate, intended by a driver, on the basis of a steering angle and vehicle velocity, and then performs understeer control for reducing engine output so as to increase an actual yaw rate and, as necessary, braking an inner front road wheel because the actual yaw rate is smaller than the target yaw rate.

Among the conventional techniques, where a vehicle seat belt apparatus and side slip etc. during turning travel of the vehicle are correlated, is a vehicle occupant restraining/protecting system disclosed in Japanese Patent Application Laid-Open Publication No. 2001-122081. When side slip or the like of a vehicle body has occurred during turning travel of a vehicle, the vehicle occupant restraining/protecting system disclosed in the 2001-122081 publication activates an electric-type pretensioner, which takes up a seat belt using yaw rate information acquired via a yaw rate sensor, yaw rate information acquired via a yaw rate sensor and the like, to pull the seat belt and thereby realizes effective protective restraint of a vehicle occupant.

However, when side slip of the vehicle body has occurred, the restraining/protecting system disclosed in the 2001-122081 publication merely detects the side slip and pulls the seat belt through activation of the electric-type pretensioner of the vehicle seat belt apparatus. Therefore, depending on the circumstances, a vehicle occupant restrained by the seat belt may have an unpleasant, uncomfortable feeling with respect to the operation of the vehicle seat belt apparatus.

When some abnormal condition, such as an oversteer or understeer condition, occurs during turning travel of a vehicle, and if the vehicle is equipped with a VSA system, behavior of the vehicle is stabilized on the basis of control by the VSA system. Thus, it is desirable that an electric-type pretensioner in the vehicle seat belt apparatus be triggered by the VSA system and effect optimal vehicle occupant restraint, in association with the vehicle-behavior stabilization control operation of the VSA system, in such a manner that any unpleasant, uncomfortable feeling is not imparted to the vehicle occupant and steering operation by the vehicle occupant (if the vehicle occupant is a driver of the vehicle) is not disturbed due to the restraining force of the belt.

Further, when the driver has made a sharp turn by rapid steering operation of the steering wheel, such rapid steering operation is determined on the basis of a signal generated by a steering angle sensor added to a steering device. In such a case too, it is desirable that the electric-type pretensioner in the vehicle seat belt apparatus be arranged to effect optimal vehicle occupant restraint by being triggered by the signal indicative of the rapid steering operation, as in the case where abnormality of vehicle behavior is dealt with by the VSA system.

SUMMARY OF THE INVENTION

In view of the foregoing prior art problems, it is an object of the present invention to provide an improved vehicle seat belt apparatus which can appropriately control vehicle-occupant holding force of a seat belt or belt take-up amount by being triggered by vehicle-behavior stabilization control operation of a VSA unit or rapid steering operation information received from a steering angle sensor, so as to optimize vehicle occupant restraint by the seat belt and prevent an unpleasant, uncomfortable feeling from being imparted to the vehicle occupant.

In order to accomplish the above-mentioned object, the present invention provides an improved vehicle seat belt apparatus, which comprises: a motor for driving a belt reel having a belt wound thereon; a trigger section for detecting a change in a traveling state of a vehicle to output an activation signal that instructs or triggers activation of the motor; a lateral acceleration detection section for detecting lateral acceleration acting on the vehicle; a slip state detection section for detecting a slip state quantity of the vehicle; and a control section for, in response to receipt of the activation signal from y the trigger section, controlling the amount of current supply for activating the motor on the basis of a signal of the lateral acceleration output by the lateral acceleration detection section and/or a signal of the slip state quantity output by the slip state detection section.

The vehicle seat belt apparatus can effect urgent take-up of the seat belt in response to control operation corresponding to rapid steering operation or vehicle-behavior stabilization control by a VSA unit. Further, the vehicle seat belt apparatus can effect optimal vehicle-occupant restraint, without imparting an unpleasant, uncomfortable feeling to the vehicle occupant, by determining vehicle-occupant holding force of the belt using information of lateral acceleration and/or quantity of a slip state (that represents a concept embracing a yaw rate offset, yaw rate, slip angle, slip angle velocity, etc.).

Preferably, the control section increases the amount of current supply to the motor as the lateral acceleration and/or the slip state quantity increases. With this arrangement, the present invention can achieve an optimal vehicle-occupant holding force in correspondence with a value of the lateral acceleration and/or slip state quantity.

Preferably, the vehicle seat belt apparatus of the present invention further comprises a rotation detection section for detecting a rotational state of the belt reel, and the control section controls the amount of current supply to the motor in such a manner that the belt take-up amount of the belt reel is increased, in response to a detection signal output by the rotation detection section, as the lateral acceleration and/or the slip state quantity increases. With this arrangement, the present invention can perform driving control of the motor while ascertaining an actual belt take-up amount of the belt reel, so that the belt take-up amount can be optimized.

Preferably, the control section obtains a first current amount determined on the basis of the lateral acceleration detected via the lateral acceleration detection section and a second current amount determined on the basis of the slip state quantity detected via the slip state detection section, and the control section determines the amount of current supply to the motor by comparing the first and second current amounts.

Preferably, the control section sets at least one of an upper limit value and lower limit value of the amount of current supply to the motor. Preferably, the control section sets an upper limit value of the belt take-up amount of the belt reel. Preferably, the control section selects the smaller of the first and second current amounts.

When the lateral acceleration is relatively great but the yaw rate offset and/or the like is small, for example, it means that control conforming to a driver's intension is being performed in response to operation by the driver. Thus, in this case, the vehicle-occupant holding force need not be increased. Conversely, when the lateral acceleration is relatively small but the yaw rate offset and/or the like is great, it means that the vehicle is currently in a slipping state. In this case, the vehicle-occupant holding force need not be increased because inertia acting on the vehicle occupant is small. Thus, this arrangement of the present invention can effectively reduce an unpleasant, uncomfortable feeling of the vehicle occupant because it does not excessively increase the vehicle-occupant restraining force.

Preferably, the control section controls the amounts of current supply to a plurality of the motors provided on left and right sides of the vehicle independently for each of the motors. Even when same acceleration and yaw rate offset and/or the like are acting on the vehicle body, different inertial force acts on vehicle occupants seated in seats located at different positions. This inventive arrangement allows an optimal vehicle-occupant holding force to act on the individual vehicle occupants in consideration of the positional difference between the seats. As an example, in a case where a shoulder belt portion of the seat belt is worn across the chest from the right shoulder to the left side of the waist and arranged to be taken up at a near-shoulder position, the occupant-posture holding effect of the belt at the time of a right (or clockwise) turn, when the vehicle occupant is forced leftward, tends to be smaller than the occupant-posture holding effect at the time of a left (or counterclockwise) turn when the vehicle occupant is forced rightward. Thus, the amount of current supply to the motor is controlled so that the amount of current supply at the time of a right turn is greater than that at the time of a left turn. For a similar reason, the belt take-up amount of the reel is controlled so that the belt take-up amount at the time of a right turn is greater than that at the time of a left turn. As a result, the vehicle-occupant holding force of the belt for protection of the vehicle occupant can be optimized to achieve an optimal holding effect.

In the vehicle seat belt apparatus of the present invention, where the motor is activated by an electric-type pretensioner to drive the belt reel to take-up the seat belt, control on the amount of electric current supply to the motor is triggered by vehicle-behavior stabilization control operation by a VSA unit or rapid steering operation detection signal and performed on the basis of lateral acceleration and/or slip state quantity. Thus, the present invention can optimize the vehicle-occupant holding force of the seat belt or optimize the belt take-up amount, reduce an unpleasant, uncomfortable feeling of the vehicle occupant due to the operation of the belt, optimize the vehicle occupant restraint by the belt and keep the vehicle occupant in a proper posture. Further, the present invention can reliably keep the driver in an optimal posture during turning of the vehicle, to thereby allow the driver to continue driving without his or her driving operation being disturbed by the operation of the belt.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
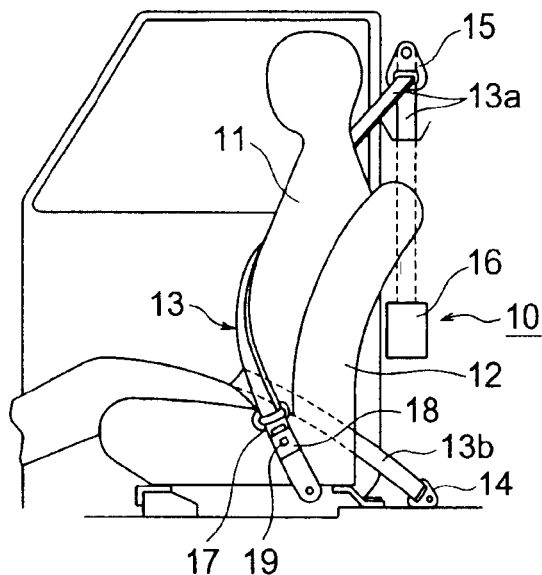
FIG. 1 is a side view of a vehicle seat belt apparatus according to an embodiment of the present invention, which particularly shows how the seat belt is attached around a vehicle occupant.
Figure 2:
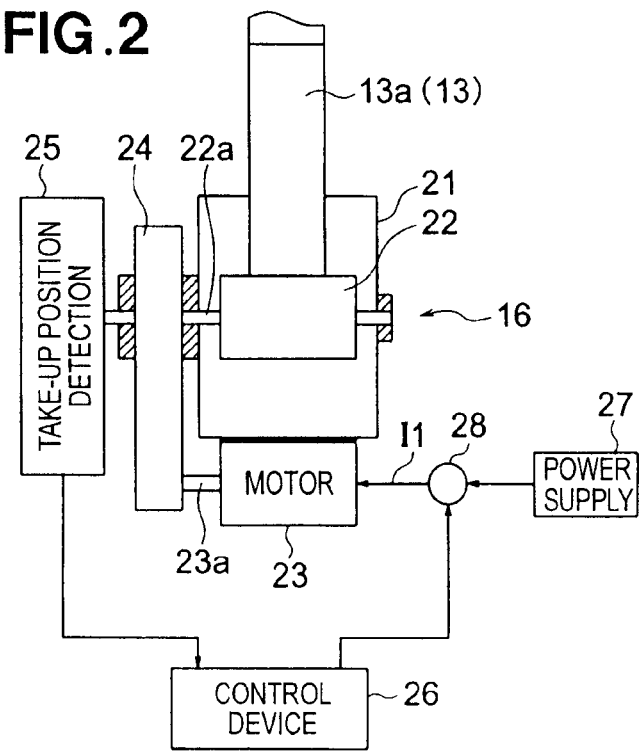
FIG. 2 is a block diagram showing an example construction of a seat belt retractor employed in the embodiment of FIG. 1.
Figure 3:
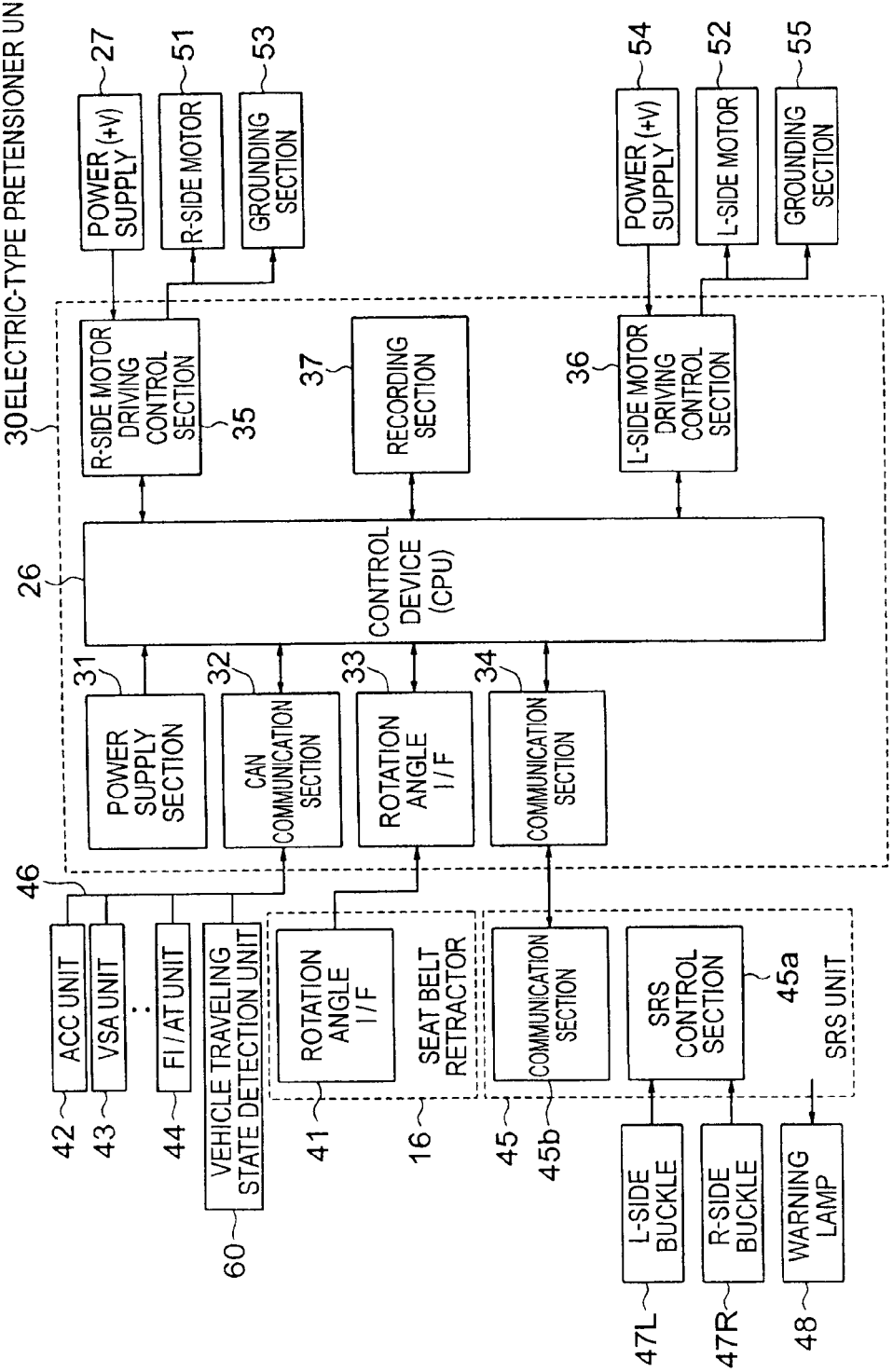
FIG. 3 is a block diagram showing a general setup of a control system employed in the embodiment.

FIG. 1 shows a vehicle seat belt apparatus 10 according to an embodiment of the present invention which is provided on, for example, a driver seat of a vehicle. FIG. 2 shows an example construction of a seat belt retractor employed in the embodimenta. FIG. 3 shows a general setup of a control system of the vehicle seat belt apparatus 10.

In FIG. 1, the seat belt apparatus 10 includes a belt (webbing) 13 for tying or restraining the body of a vehicle occupant 11 to the seat 12. The belt 13 includes an upper belt portion 13a for restraining an upper body portion of the vehicle occupant 11, and a lower belt portion 13b for restraining a waist portion of the vehicle occupant 11. The lower belt portion 13b is fixed at one end to a vehicle body portion, located in a lower area of a vehicle compartment, by means of an anchor plate 14. The upper belt portion 13a is folded back via a through-anchor 15 provided near the shoulder of the vehicle occupant 11, and it is connected at one end to a belt reel of the retractor 16. Tongue plate 17 is attached to a region of the belt 13 where the respective distal ends of the upper and lower belt portions 13a and 13b merge with each other. The tongue plate 17 is detachably attached to a buckle 18 fixed to one side of a lower seat section of the seat 12, and a buckle switch 19 for detecting connection, to the buckle 18, of the tongue plate 17 is provided on the buckle 18.

FIG. 2 shows a general configuration of primary sections of the seat belt retractor 16. The retractor 16 includes the belt reel (spindle) 22 rotatably mounted in a housing 21, and a motor 23 for rotationally driving the belt reel 22. The upper belt portion 13a is connected at the one end to the belt reel 22 as noted above, so that it is taken up by the belt reel 22. The belt reel 22 has a shaft 22a connected, via a power transmission mechanism (e.g., gear mechanism) 24, to a drive shaft 23a of the motor 23. Thus, the belt reel 22 is rotationally driven by the motor 23 via the power transmission mechanism 24. The seat belt retractor 16 also includes a take-up position detection section 25 connected to the shaft 22a of the belt reel 22.

The take-up position detection section 25 preferably comprises a rotation angle sensor that is, for example, in the form of a magnetic sensor comprising a combination of a magnetic disk and two Hall ICs. Minimum resolution of this rotation angle sensor is, for example, 4° that is in the order of about 1.3-1.6 mm in terms of the length of the seat belt. Alternatively, the take-up position detection section 25 may comprise a belt length sensor in place of the rotation angle sensor.

The take-up position detection section 25 is capable of detecting a belt take-up position of the belt reel 22 by detecting a rotation angle of the belt reel 22 by means of the rotation angle sensor provided therein. Detection signal output from the take-up position detection section 25 is supplied to a control device 26. Rotational operation, i.e. belt take-up or belt pay-out operation, of the retractor 16 is controlled by the control device 26. More specifically, the control device 26 controls the belt take-up operation of the retractor 16 by controlling, by means of a current supply amount adjustment section 28, an amount of a motor-energizing current (i.e., current supply to the motor) I1 to be supplied from a power supply 27 to the motor 23. The seat belt retractor 16, whose belt take-up operation etc. are controlled by the control device 26, is constructed as an electric-type pretensioner for holding the vehicle occupant 11 in a proper posture and position.

Whereas the vehicle seat belt apparatus 10 and retractor 16 etc., included in the seat belt apparatus 10, have been described above as provided on the driver seat, a similar seat belt apparatus 10, retractor 16, etc. are also provided on a front passenger seat. In the following description, various components provided on the driver seat will sometimes be mentioned with a prefix "R-side", while some components provided on the front passenger seat will sometimes be mentioned with a prefix "L-side."

With reference to FIG. 3, the following paragraphs describe an example general hardware setup of the control system for controlling the seat belt apparatus 10 etc. The control system of FIG. 3 is implemented by a computer unit mounted on the vehicle. The control system includes the above-mentioned control device 26. In FIG. 3, the above-described control device 26 is in the form of a CPU and functions as a main computer of the vehicle-mounted computer unit. The control device 26 has various other control functions than the function for controlling the seat belt apparatus 10.

In FIG. 3, a block 30, including the control device 26, represents an electric-type pretensioner unit for allowing the vehicle occupant 11 to be held in a proper position and posture by means of the seat belt. The block 30 also includes, at an input side of the control device 26, a power supply section 31, in-vehicle network (commonly known as "CAN" or "Controller Area Network") communication section 32, rotation angle interface (I/F) section 33 and communication section 34. The block 30 also includes, at an output side of the control device 26, an R-side motor driving control section 35, L-side motor driving control section 36 and recording section 37 that is in the form of a memory.

Further, at an input side of the block 30, there is provided a block representing the above-mentioned seat belt retractor 16 employed in the instant embodiment. The seat belt retractor 16 includes a rotation angle interface (I/F) section 41 for transmitting the detection signal, generated by the above-mentioned take-up position detection section 25, to the control device 26. The rotation angle interface section 41 is connected to the above-mentioned rotation angle interface section 33 within the block 30 and transmits the detection signal from the take-up position detection section 25 to the rotation angle interface section 33. The aforementioned seat belt retractor 16 is provided on each of the driver seat, front passenger seat, etc.

At the input side of the block 30, there are further provided an Adaptive Cruise Control (ACC) unit (i.e., unit for controlling an obstacle detection device etc.) 42, Vehicle Stability Assist (VSA) unit (i.e., vehicle behavior stabilization control unit) 43, Fuel Injection/Automatic Transmission unit 44, Supplementary Restraint System (SRS) unit 45, etc.

Figure 4:
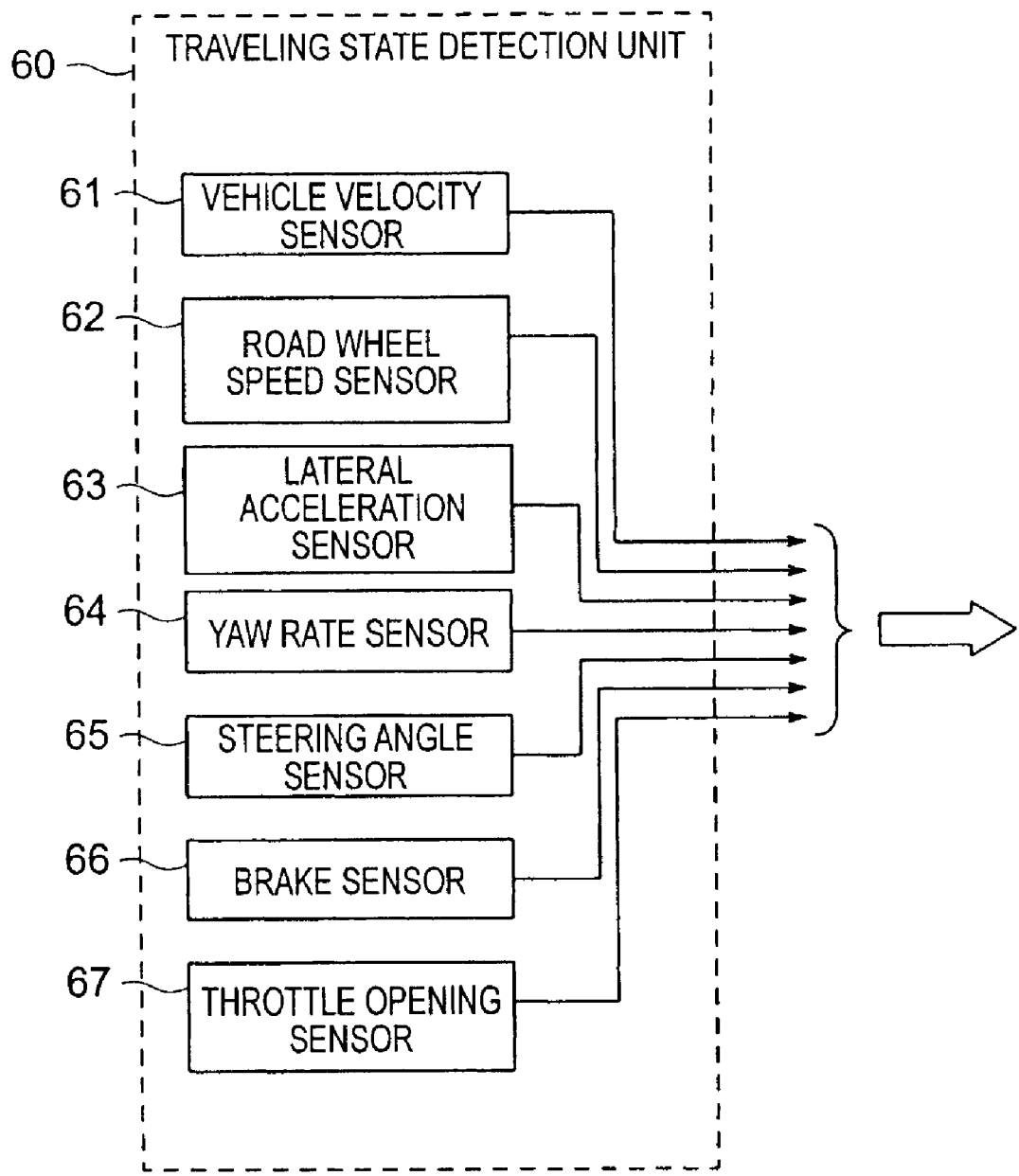
FIG. 4 is a block diagram showing an inner construction of a traveling state detection unit employed in the embodiment.

The input-side components of the block 30 also include a vehicle traveling state detection unit 60. As shown in FIG. 4, the vehicle traveling state detection unit 60 includes: four road wheel speed sensors 62 provided in corresponding relation to left and right front road wheels and left and right rear road wheels; lateral acceleration sensor (lateral G sensor) 63; yaw rate sensor 64; steering angle sensor (absolute steering angle sensor) 65 attached to a steering device; brake sensor 66; throttle opening sensor 67, etc. Further, as necessary, the vehicle traveling state detection unit 60 may includes a front-rear acceleration sensor for detecting acceleration, in a front-rear direction, of the vehicle, roll angle sensor and turning angle sensor, etc. Various sensors (detection means) included in the vehicle traveling state detection unit 60 are not only used to perform the behavior stabilization control function by the VSA unit, rapid steering operation determination function, side slip determination function, etc., but also used in an emergent belt take-up amount control pertaining to an emergent belt take-up function by the embodiment of the vehicle seat belt apparatus 10.

Respective output signals of the ACC unit 42, VSA unit 43, FI/AT unit 44, vehicle traveling state detection unit 60, etc. are supplied, via an in-vehicle network 46, to the in-vehicle network communication section 32. Further, detection signals output from the various sensors included in the vehicle traveling state detection unit 60 are supplied to the control device 26 by way of the in-vehicle network 46 and in-vehicle network communication section 32.

The SRS unit 45 includes an SRS control section 45a that receives output signals from an R-side buckle 47R and L-side buckle 47L, and a communication section 45b. The R-side buckle 47R corresponds to the above-mentioned driver-seat-side buckle 18, while the L-side buckle 47L is a buckle of the seat belt apparatus provided on the front passenger seat. The respective output signals from the R-side buckle 47R and L-side buckle 47L are detection signals from buckle switches contained in the buckles 47R and 47L. Once the SRS control section 45a receives the output signal from the R-side buckle 47R or L-side buckle 47L, it transmits the received signal to the communication section 32 of the block 30 via the communication section 45b. Further, when the seat belt is not being used properly during travel of the vehicle, the SRS unit 45 gives a warning signal to a warning lamp 48.

At an output side of the block 30, there are provided an R-side motor 51 and L-side motor 52. The R-side motor 51 is a driving motor for the driver-seat-side seat belt apparatus 10 and provided in correspondence with the R-side motor driving control section 35. The R-side motor driving control section 35 controls an amount of electric current supply from the above-mentioned power supply (+V) 27, on the basis of a control instruction signal given from the control device 26, to thereby supply a driving current to the R-side motor 51. Block 53 represents a grounding section. Further, the L-side motor 52 is a driving motor for the front-passenger-seat-side seat belt apparatus 10 and provided in correspondence with the L-side motor driving control section 36. The L-side motor driving control section 36 controls an amount of electric current supply from a power supply (+V) 54, on the basis of a control instruction signal given from the control device 26, to thereby supply a driving current to the L-side motor 52. Further, block 55 represents a grounding section. The grounding sections 53 and 55 are ground terminals forming part of the vehicle body.

Figure 5:
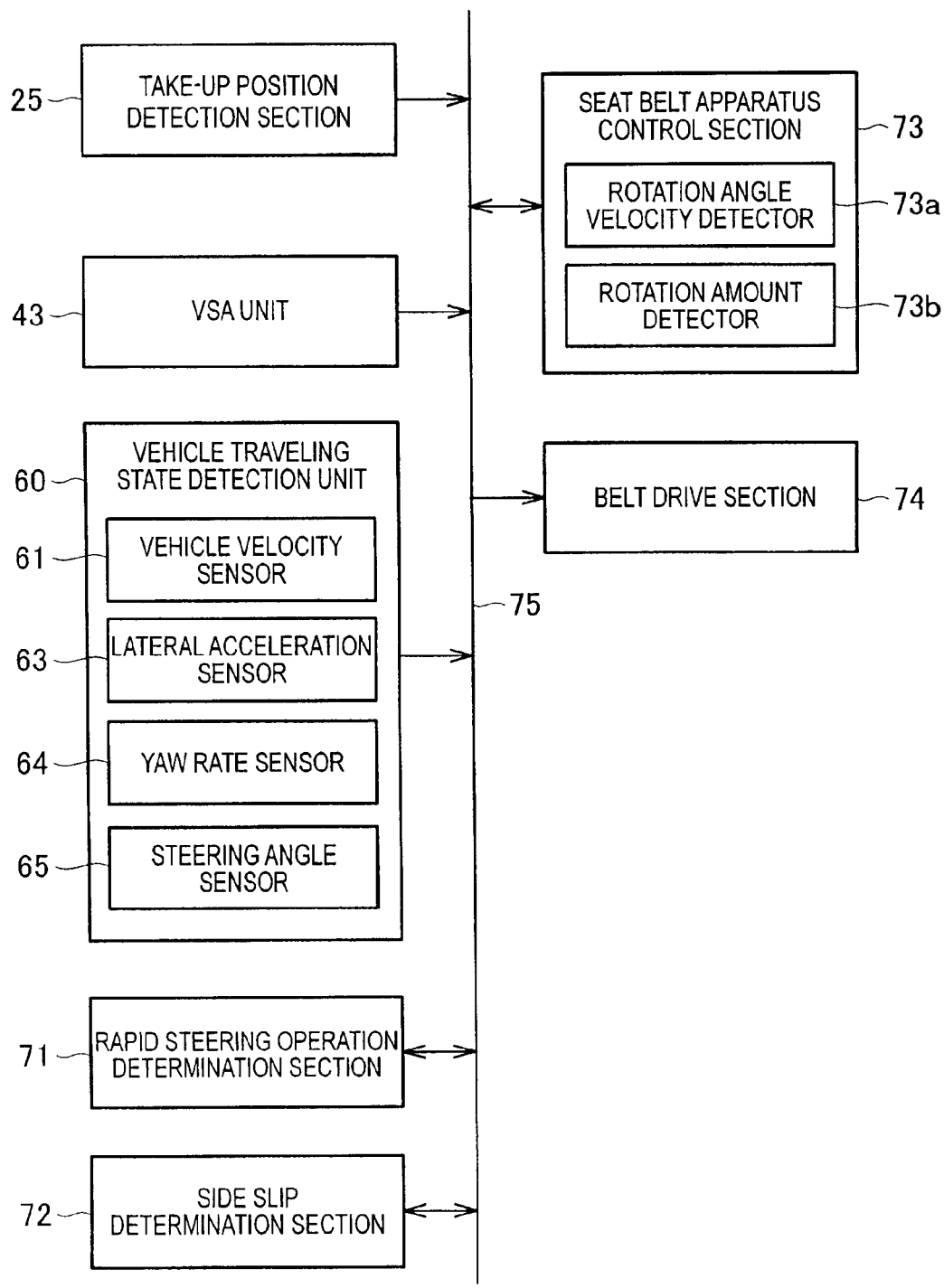
FIG. 5 is a functional block diagram conceptually showing an example fundamental setup of the control system employed in the embodiment.

FIG. 5 is a functional block diagram conceptually showing an example fundamental setup of the control system for controlling the seal belt apparatus 10 according to the instant embodiment. The control system includes, as its primary or relevant components, the aforementioned take-up position detection section 25, VSA unit 43, vehicle traveling state detection unit 60, rapid steering operation determination section 71, side slip determination section 72, seat belt apparatus control section 73 and belt drive section 74. These components are interconnected via a signal transfer path (e.g., bus) 75, so that data can be communicated between the components. Trigger means for activating the motor rapid in the embodiment is constituted by the steering operation determination section 71 and side slip determination section 72.

As set forth above, the vehicle traveling state detection unit 60 includes the vehicle velocity sensor 61, lateral acceleration sensor 63, yaw rate sensor 64 and steering angle sensor 65.

Normally, the side slip determination section 72 constitutes part of the VSA unit 43 and is implemented by an arithmetic processing function of the control device (CPU) 26, and thus, it is shown by a separate block.

The rapid steering operation determination function and side slip determination function of the determination sections 71 and 72 are implemented by the arithmetic processing function (arithmetic algorithms) of the control device (CPU) 26. Further, the seat belt apparatus control section 73 is implemented by the arithmetic processing function of the control device 26 and the R-side and L-side motor driving control sections 35 and 36. The seat belt apparatus control section 73 includes a detector 73a for detecting a rotation angle velocity of the belt reel 22, and a detector 73b for detecting a rotation amount (belt take-up amount) of the belt reel 22 on the basis of the signal supplied from the take-up position detection section 25. The belt drive section 74 corresponds to the aforementioned retractor 16, and more specifically to the R-side and L-side motors 51 and 56.

Figure 6:
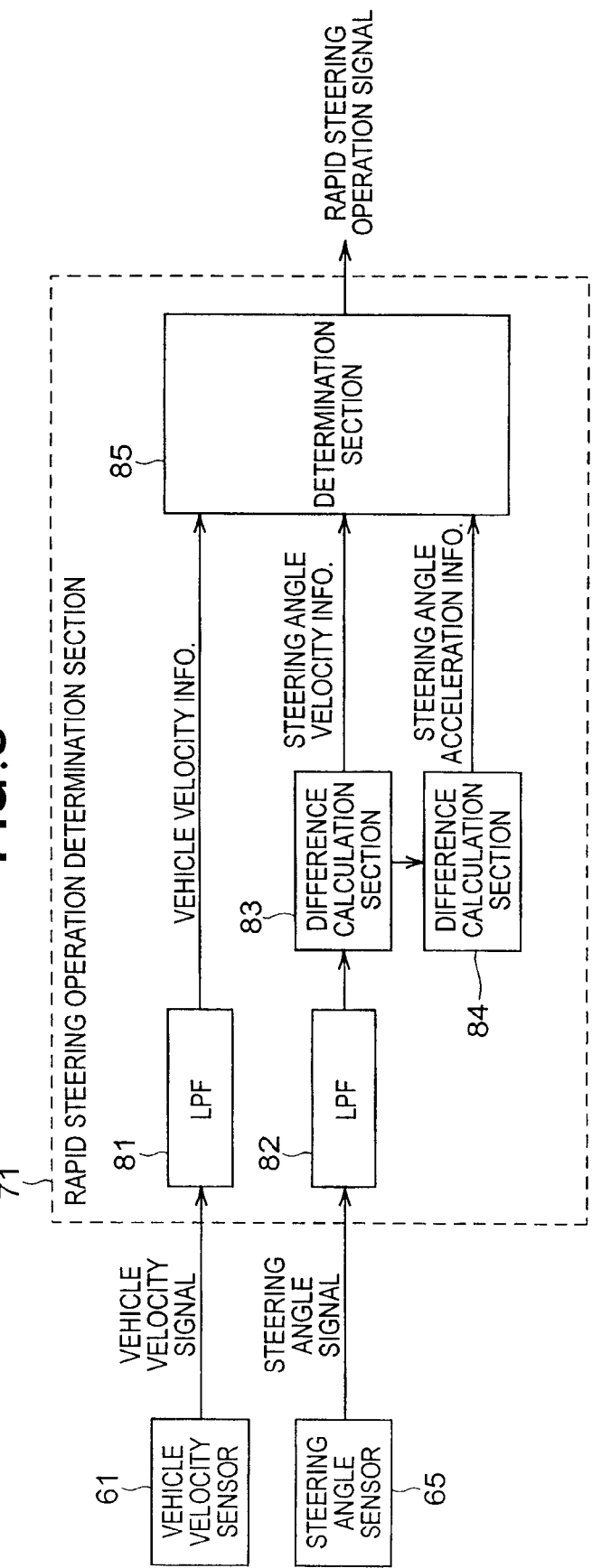
FIG. 6 is a block diagram showing an inner construction of a rapid steering operation determination section provided in the vehicle seat belt apparatus.

FIG. 6 shows a detailed construction of the rapid steering operation determination section 71. The rapid steering operation determination section 71 extracts vehicle velocity information by passing the vehicle velocity signal, given from the vehicle velocity sensor 61, through a vehicle velocity Low Pass Filter (LPF) 81. The rapid steering operation determination section 71 also extracts steering angle information by passing the steering angle signal, given from the steering angle sensor 65, through a steering angle Low Pass Filter (LPF) 82. Then, the rapid steering operation determination section 71 calculates steering angle velocity information by a first difference calculation section 83 performing a difference calculation on the basis of the steering angle information extracted via the steering angle Low Pass Filter (LPF) 82. Further, the rapid steering operation determination section 71 calculates steering angle acceleration information by a second difference calculation section 84 performing a difference calculation on the basis of the steering angle velocity information. On the basis of the vehicle velocity information, steering angle speed information and steering angle acceleration information extracted in the aforementioned manner, a determination section 85 determines whether the vehicle is currently in a rapidly-steered state. More specifically, the determination section 85 determines whether the or not vehicle is currently in a rapidly-steered state, by comparing the calculated steering angle and steering angle acceleration against predetermined threshold values corresponding to a current vehicle velocity. If the determination section 85 has determined that the vehicle is currently in a rapidly-steered state, it outputs a rapid steering operation signal. Algorithm for the rapid steering operation determination function by the rapid steering operation determination section 71 is executed in a loop time of, for example, 10 ms. Note that the rapid steering operation may be determined on the basis of the steering angle and steering angle velocity alone.

Once the rapid steering operation signal is output from the rapid steering operation determination section 71, generation of a signal for activating the belt take-up motor is triggered by this rapid steering operation signal, so that the seat belt apparatus 10 urgently takes up the belt 13 on the basis of a control function of the seat belt apparatus control section 73.

Figure 7:
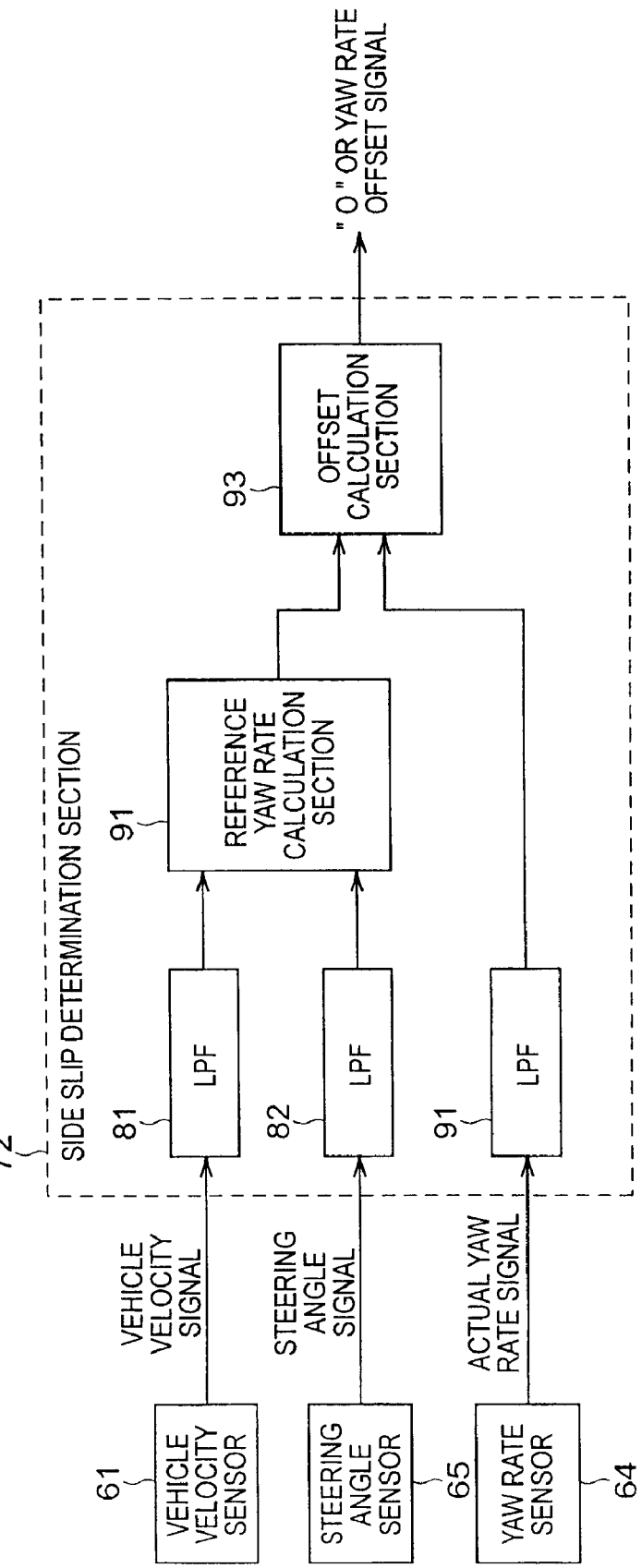
FIG. 7 is a block diagram showing an inner construction of a side slip determination section provided in the vehicle seat belt apparatus.

FIG. 7 shows an example construction of the above-mentioned side slip determination section 72. The side slip determination section 72 extracts vehicle velocity information by passing the vehicle velocity signal, given from the vehicle velocity sensor 61, through the vehicle velocity Low Pass Filter (LPF) 81. The side slip determination section 72 also extracts steering angle information by passing the steering angle signal, given from the steering angle sensor 65, through the steering angle vehicle velocity Low Pass Filter (LPF) 82. Further, the side slip determination section 72 extracts yaw rate information by passing an actual raw rate signal, given from the yaw rate sensor 64, through a yaw rate Low Pass Filter (LPF) 91. Reference yaw rate calculation section 92 calculates a reference yaw rate on the basis of the vehicle velocity information extracted via the vehicle velocity LPF 81 and steering angle information extracted via the steering angle LPF 82. Values of the reference yaw rate calculated by the reference yaw rate calculation 92 and actual yaw rate extracted via the yaw rate LPF 91 are input to an offset calculation section 93, which calculates an offset between the values of the reference and actual yaw rates. If the offset calculated by the offset calculation section 93 is "0", it is determined that the vehicle is not currently slipping sideways. If the offset calculated by the offset calculation section 93 is "0" and a "yaw rate offset signal" greater than a predetermined level has been output from the offset calculation section 93, it is determined that the vehicle is not currently suffering from a side slip. The algorithm for the side slip determination function by the side slip determination section 72 is executed in a loop time of, for example, 10 ms. The side slip determination section 72 is arranged to determine presence/absence of a side slip by acquiring a yaw rate offset signal using the actual yaw rate signal from the yaw rate sensor 64. Generally, however, the side slip determination section 72 may also be arranged to determine presence/absence of a side slip by acquiring a yaw rate itself, slip angle (i.e., disagreement between a velocity vector and attitude direction of the vehicle body) or slip angle velocity.

Once the yaw rate offset signal has been output from the offset calculation section 93, the yaw rate offset signal is used as a trigger for generating the signal for activating the belt take-up motor, and the seat belt apparatus 10 urgently takes up the belt 13 on the basis of the control function of the seat belt apparatus control section 73 as will be later detailed. In this case, the aforementioned electric-type pretensioner 30 is activated to drive the motor 23 so that the belt 13 is taken up by the belt reel 22. Here, a motor control amount, which determines a belt take-up amount, is calculated on the basis of a combination of the actual yaw rate value or yaw rate offset value and a minimum value of lateral acceleration detected by the lateral acceleration sensor 63. Further, because the behavior stabilizing operation of the VSA unit 43 is performed in response to occurrence of a predetermined side slip state as well known, operation information of the VSA unit 43 itself may be used as the trigger. Alternatively, a combination of an activation signal of another conventionally-known device, such as the Anti-lock Braking System (ABS), and a signal indicative of lateral acceleration or the like may be used as the trigger.

Further, when the seat belt apparatus 10 is to perform its urgent belt take-up operation, on the basis of the control function of the seat belt apparatus control section 73, in response to detection of a change in the traveling state (behavioral condition) of the vehicle, either one of the above-mentioned rapid steering operation signal and yaw rate offset signal may be used, with a priority over the other, as a trigger for activating the urgent belt take-up operation, or such a trigger may be generated by appropriately logically combining the rapid steering operation signal and yaw rate offset signal.

Now, with reference to a flow chart of FIG. 8, a description will be given about a first example of operational control performed on the seat belt apparatus 10 by the seat belt apparatus control section 73 on the basis of the control system arrangements shown in FIG. 5. This operational control is intended to control the belt take-up operation based on the rapid steering operation determination or side slip determination.

Figure 8:
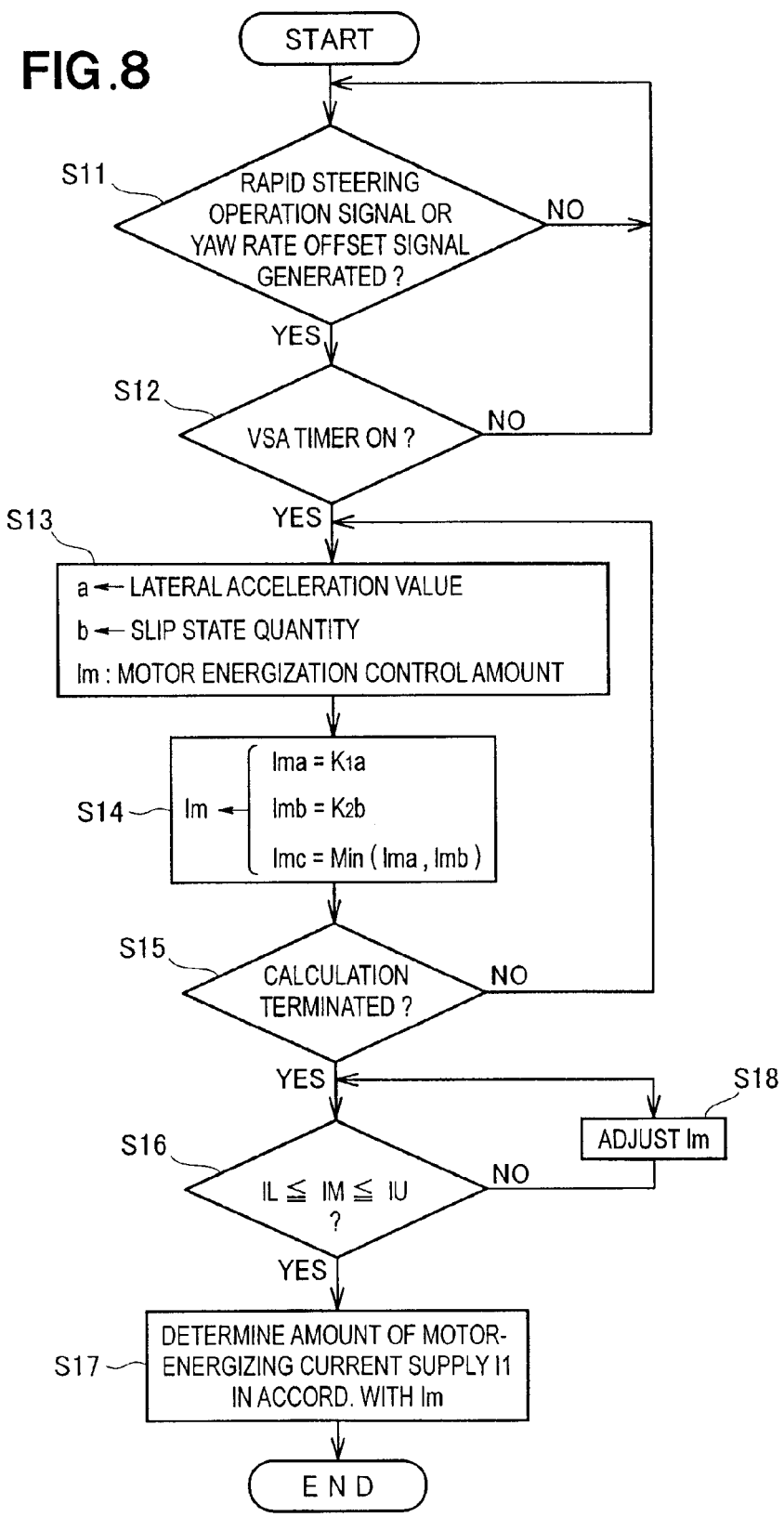
FIG. 8 is a flow chart showing a first example of operational control performed on the seat belt apparatus according to the embodiment.

The flow chart of FIG. 8 shows a flow or sequence of control operations performed after the vehicle occupant 11 is seated in the seat 12, attaches the seat belt 13 around his or her body and then couples the tongue plate 17 to the buckle 18 so that the buckle switch 19 is turned on. This sequence of control operations is triggered, during travel of the vehicle, by rapid steering operation of the steering wheel of the steering device or by occurrence of a side slip state, i.e. vehicle-behavior stabilization control operation performed by the VSA unit 43.

The sequence of control operations will be described in relation to the R-side motor 51 (or the above-mentioned motor 23).

At step S11, a determination is made as to whether a rapid steering operation signal or yaw rate offset signal as the above-mentioned trigger has been generated. With a NO determination at step S11, the determination operation of step S11 is repeated at predetermined time intervals. Once a YES determination is made at step S11, the control proceeds to next step S12.

At step S12, a further determination is made as to whether a VSA timer for signaling an operating state of the VSA unit is currently ON. With a NO determination at step S12, the determination operations of steps S11 and S12 are repeated. Once a YES determination is made at step S12, the control moves on to next step S13. The above-mentioned VSA timer may be constructed to be operative for a predetermined time after turning-on of the VSA unit, so as to avoid unwanted discontinuation of the control.

At step S13, three variables "a", "b" and "Im" are set. To the variable "a" is assigned a lateral acceleration value acquired via the lateral acceleration sensor 63. To the variable "b" is assigned a quantity of a slip state, such as a yaw rate, yaw rate offset, slip angle or slip angle velocity, determined in a well-known manner on the basis of a signal generated by the vehicle velocity sensor 61, yaw rate sensor 64 and steeling angle sensor 65. Further, the variable "Im" is defined as a variable of the motor energization control amount. Following step S13, the control proceeds to step S14.

At step S14, a motor energization (i.e., current-supply-to-motor) control amount is calculated on the basis of three mathematical expressions. The first mathematical expression is "Ima=$K_1 a$", where $K_1$ is a predetermined proportionality coefficient. Energization (i.e., current-supply-to-motor) control amount "Ima" proportional to the lateral acceleration value (variable "a") is determined by the first mathematical expression. The second mathematical expression is "Imb=$K_2 b$", where $K_2$ is a predetermined proportionality coefficient. Energization control amount "Imb" proportional to the slip state quantity (variable "b") is determined by the second mathematical expression. Further, the third mathematical expression is "Imc=Min (Ima, Imb)", where "Min" represents a function to select the smaller of the two energization control amounts "Ima" and "Imb". By the third mathematical expression, the smaller of the energization control amount proportional to the lateral acceleration value (variable "a") and energization control amount "Imb" proportional to the slip state quantity (variable "b") is determined as a motor energization control amount "Imc".

In the aforementioned manner, it is possible to increase the motor energization control amount as the lateral acceleration value or slip state quantity increases. Thus, it is possible to set an appropriate belt take-up amount corresponding to a current traveling state of the vehicle.

Any one or all of the aforementioned three mathematical expressions may be executed. At step S14, any of the energization control amounts "Ima", "Imb" and "Imc" determined in the aforementioned manner is ultimately assigned to the variable Im pertaining to the motor energization control amount. After that, the control proceeds to step S15, where a determination is made as to whether the aforementioned calculation of the energization control amount has been terminated. With a NO determination at step S15, the operations of steps S13 and S14 are repeated. This means that the calculation of the energization control amount continues to be performed in response to variation in the traveling state of the vehicle. With a YES determination at step S15, on the other hand, the calculation of the energization control amount is brought to an end, and the control goes to step S16.

At step S16, a determination is made as to whether the ultimately-determined energization control amount Im falls within a predetermined range defined by an upper limit value ($I_U$) and lower limit value ($I_L$). With a YES determination at step S16, the control proceeds to step S17, where the amount of current supply to the motor (i.e., motor-energizing current supply) I1 is determined in accordance with the energization control amount Im. Namely, driving of the motor (23, 51) is controlled using the energization control amount Im. With a NO determination at step S16, the energization control amount Im is adjusted, at step S18, so that it falls within the predetermined range mentioned above in relation to step S16. Following the energization control amount adjustment at step S18, the operation of step S17 is performed as noted above to control the driving of the motor (23, 51); thus, the motor is activated to attain an optimal vehicle-occupant holding force.

In an alternative, only one of the upper and lower limit values may be set of the predetermined range to be referred to at step S16.

Figure 9:
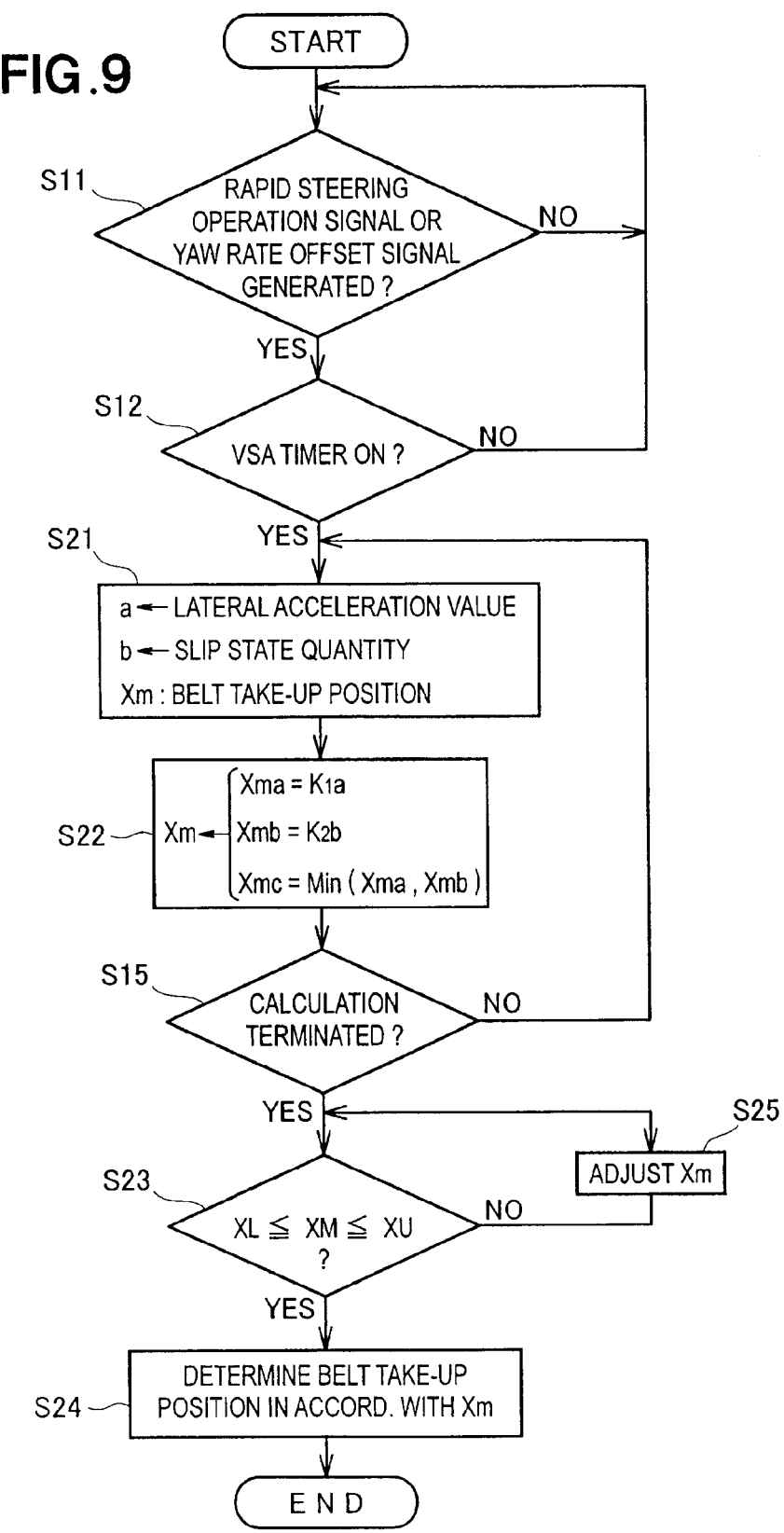
FIG. 9 is a flow chart showing a second example of the operational control performed on the seat belt apparatus according to the embodiment.

Next, with reference to a flow chart of FIG. 9, a description will be given about a second example of the operational control performed on the seat belt apparatus 10. This example too is intended to control the belt take-up operation based on the rapid steering operation determination or side slip determination. In FIG. 9, the same elements as in FIG. 8 are indicated by the same reference characters as used in FIG. 8 and will not be described in detail to avoid unnecessary duplication, and the following paragraphs mainly describe differences from the example of FIG. 8. Steps S11, S12 and S15 in FIG. 9 are the same as those in FIG. 8, and steps S21-S25 are characteristic of the second example. The control operational sequence represented by the flow chart of FIG. 9 is generally similar to the control operational sequence represented by the flow chart of FIG. 8. The second example of the operational control is characterized in that the object to be controlled is the belt take-up position rather than the amount of current supply to the motor.

In the second example of the operational control of FIG. 9, steps S11 and S12 are the same as steps S11 and S12 in the first example of the operational control of FIG. 8. At next step S21, three variables "a", "b" and "Xm" are set. To the variable "a" is assigned a lateral acceleration value. To the variable "b" is assigned a quantity of a slip state, such as a yaw rate, yaw rate offset, slip angle or slip angle velocity, determined in a well-known manner on the basis of a signal generated by the vehicle velocity sensor 61, yaw rate sensor 64 and steering angle sensor 65. Further, the variable "Xm" is defined as a variable of the belt take-up position.

At step S22, a belt take-up position control amount is calculated on the basis of three mathematical expressions. The first mathematical expression is "Xma=$K_1 a$", by which a take-up position control amount "Xma" proportional to the lateral acceleration value (variable "a") is determined. The second mathematical expression is "Xmb=$K_2 b$", by which a take-up position control amount "Xmb" proportional to the slip state quantity (variable "b") is determined. Further, the third mathematical expression is "Xmc=Min (Xma, Xmb)", where "Min" represents a function to select the smaller of the two take-up position control amounts "Xma" and "Xmb". By the third mathematical expression, the smaller of the take-up position control amount proportional to the lateral acceleration value (variable "a") and belt take-up position control amount proportional to the slip state quantity (variable "b") is determined as a belt take-up position control amount "Xmc".

In the aforementioned manner, it is possible to increase the belt take-up position control amount as the lateral acceleration value or the slip state quantity increases, and thus, it is possible to set an appropriate belt take-up position corresponding to a current traveling state of the vehicle.

Any one or all of the aforementioned three mathematical expressions may be executed. At step S22, any of the control amounts "Xma", "Xmb" and "Xmc" determined in the aforementioned manner is ultimately assigned to the variable Xm of the belt take-up position control amount. After that, the control proceeds to step S15, where a determination is made as to whether the aforementioned calculation of the current supply control amount has been terminated. With a NO determination at step S15, the operations of steps S21 and S22 are repeated. With a YES determination at step S15, on the other hand, the calculation of the take-up position control amount is brought to an end, and control goes to step S23.

At step S23, a determination is made as to whether the ultimately-determined belt take-up position control amount Xm falls within a predetermined range defined by an upper limit value (XU) and lower limit value (XL). With a YES determination at step S23, the control proceeds to step S24, where a belt take-up position is determined in accordance with the belt take-up position control amount Xm. Namely, driving of the motor (23, 51) is controlled using the belt take-up position control amount Xm. With a NO determination at step S23, the belt take-up position control amount Xm is adjusted, at step S25, so that it falls within the predetermined range mentioned above in relation to step S23. Following the belt take-up position adjustment at step S25, the operation of step S24 is performed as noted above to control the driving of the motor (23, 51). Thus, the motor is activated to attain an appropriate belt take-up position. In an alternative, only one the upper and lower limit values may be set of the predetermined range to be referred to at step S23.

Figure 10:
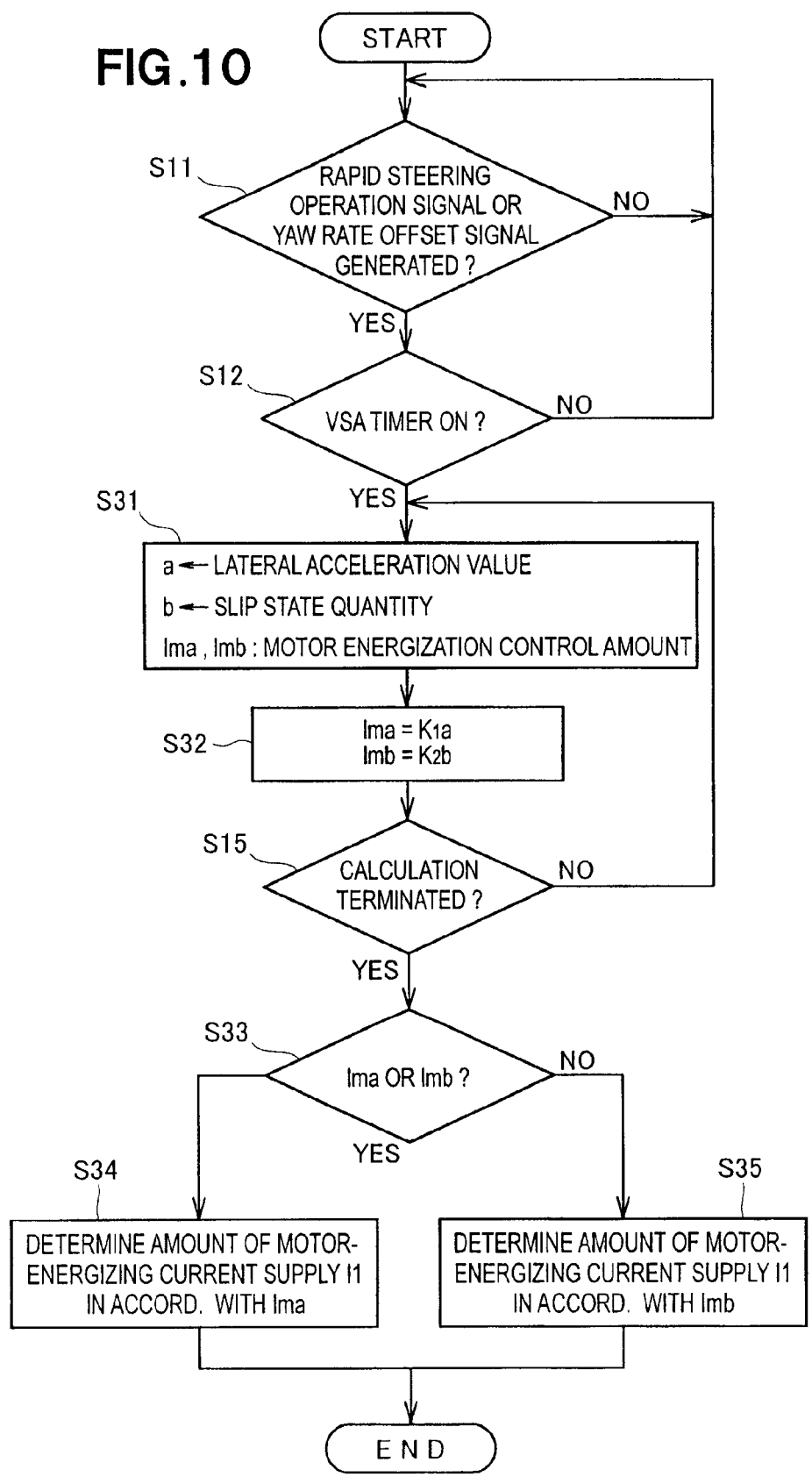
FIG. 10 is a flow chart showing a third example of the operational control performed on the seat belt apparatus according to the embodiment.

Next, with reference to a flow chart of FIG. 10, a description will be given about a third example of the operational control performed on the seat belt apparatus 10. This example too is intended to control the belt take-up operation based on the rapid steering operation determination or side slip determination. In FIG. 10, the same elements as in FIG. 8 are indicated by the same reference characters as used in FIG. 8 and will not be described in detail to avoid unnecessary duplication, and the following paragraphs mainly describe differences from the examples of FIGS. 8 and 9. Steps S11, S12 and S15 in FIG. 10 are the same as those in FIGS. 8 and 9, and steps S31-S35 are characteristic of the third example.

At next step S31, four variables "a", "b", "Ima" and "Imb" are set. To the variable "a" is assigned a lateral acceleration value detected via the lateral acceleration sensor 63. To the variable "b" is assigned an amount of a slip state, such as a yaw rate, yaw rate offset, slip angle or slip angle velocity, determined in a well-known manner on the basis of a signal generated by the vehicle velocity sensor 61, yaw rate sensor 64 and steering angle sensor 65. Further, the other two variables "Ima" and "Imb" are defined as variables of the energization (i.e., current-supply-to-motor) control amount. Following step S31, the control proceeds to step S32.

At step S32, energization control amounts are calculated on the basis of two mathematical expressions. The first mathematical expression is "Ima=$K_1 a$", where $K_1$ is a predetermined proportionality coefficient. By the first mathematical expression, an energization control amount "Ima" proportional to the lateral acceleration value (variable "a") is determined. The second mathematical expression is "Imb=$K_2 b$", where $K_2$ is a predetermined proportionality coefficient. By the second mathematical expression, an energization control amount "Imb" proportional to the slip state quantity (variable "b") is determined. After step S32, the control goes to step S33 by way of step S15.

At step S33, the above-mentioned two energization control amounts "Ima" and "Imb" are compared so that any one of the two is selected on the basis of a predetermined appropriate criterion and then step S34 or S35 is carried out with the selected energization control amount. Namely, an amount of current supply to the motor (i.e., motor-energizing current supply) I1 is determined in accordance with the energization control amount "Ima" or "Imb", and driving control of the motor is performed in accordance with the thus-determined amount current supply to the motor I1.

Figure 11:
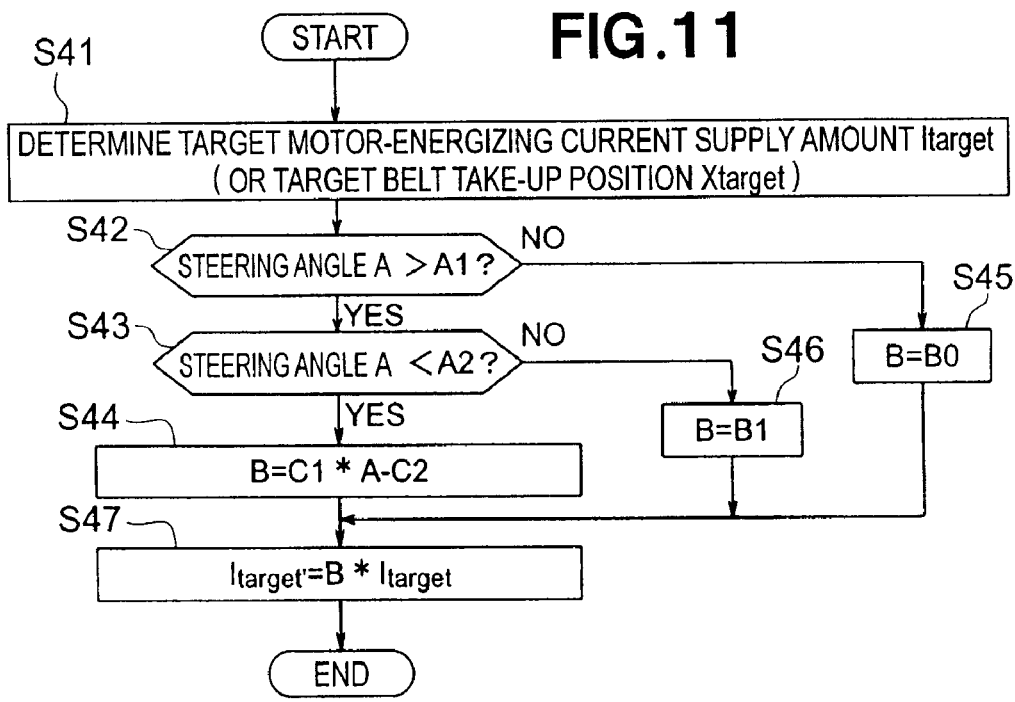
FIG. 11 is a flow chart showing an example of correction control performed on the seat belt apparatus according to the embodiment.

Next, with reference to FIG. 11, a description will be given about an example of correction control performed on the seat belt apparatus 10. This correction control is intended to correct, on the basis of the steering angle (A) detected via the steering angle sensor 65, a target current (or target belt take-up position) that determines an amount of current supply to the motor (i.e., motor-energizing current). More specifically, the correction control is performed for variably controlling the operation of the electric-type pretensioner unit 30 in taking up the seat belt 13 or retaining the seat belt 13 in a given position in accordance with, for example, the steering angle of the steering wheel if the seat belt apparatus 10 in question is provided in the driver's seat.

At first step S41, a target motor-energizing current supply amount (i.e., target amount of current supply to the motor) $I_{target}$ (or target belt take-up position $X_{target}$) is determined.

If the steering angle A is greater than a predetermined lower limit threshold value A1 (YES determination at step S42) and smaller than a predetermined upper limit threshold value A2 (YES determination at step S43), a calculation is performed about a variable B (correction coefficient) at step S44. Namely, at step S44, a correction coefficient B is calculated on the basis of a mathematical expression "B=C1*A−C2" (where C1 and C2 represent mathematical constants and * represents multiplication operation). If the steering angle A is equal to or smaller than the lower limit threshold value A1 as determined at step S42, a value "B0" is assigned to the variable B and used as the correction coefficient (step S45). Further, if the steering angle A is equal to or greater than the upper limit threshold value A2 as determined at step S43, a value "B1" is assigned to the variable B and used as the correction coefficient (step S46).

Figure 12:
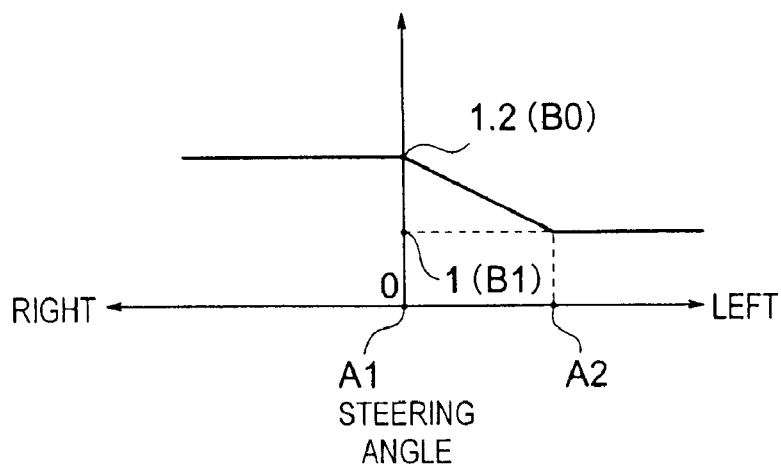
FIG. 12 is a graph showing variation in a correction coefficient value of a target belt take-up amount.

Then, step S47 is performed using the correction coefficient B determined at any one of steps S44, S45 and S46. More specifically, a correction calculation of "B*$I_{target}$" is performed using the determined correction coefficient B, and the value calculated by the correction calculation is set as the target motor-energizing current supply amount $I_{target}$. If the vehicle is a right-hand-drive vehicle, the value "B0" is for example "1.2" while the value "B1" is for example "1", as shown in FIG. 12.

The control operations have been described above in relation to the seat belt apparatus 10 of the driver's seat. In the case of the seat belt apparatus 10 of another seat than the driver's seat (e.g., front passenger's seat) too, there would occur the inconvenience, due to a construction of a shoulder belt portion of the seat belt that, if the belt portion is set to restrain the vehicle occupant with uniform lateral tension, the inward ("inward" as viewed in a turning direction of the vehicle) restraining force is smaller than the outward restraining force. Thus, in order to achieve equal vehicle-occupant restraining performance with respect to both of left and right turns of the vehicle, it is desirable to perform control such that the belt tension be increased at the time of turning of the vehicle in the same direction as the positional direction of the seat as compared to that at the time of turning of the vehicle in the opposite direction (i.e., outward direction) to the positional direction of the seat.

Figure 13:
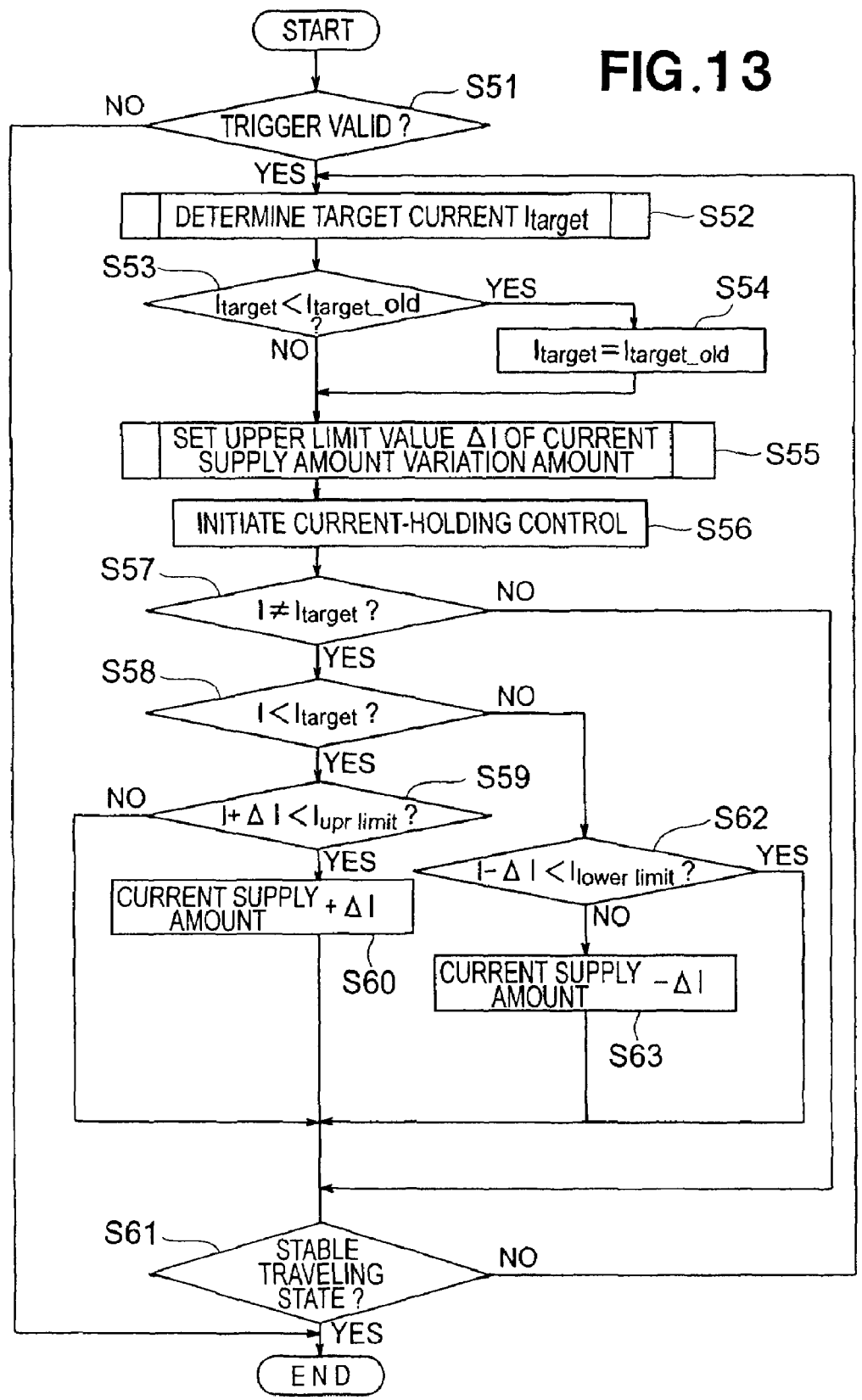
FIG. 13 is a flow chart explanatory of how a seat-belt pulling or pay-out amount is determined on the basis of a determined target current.
Figure 14:
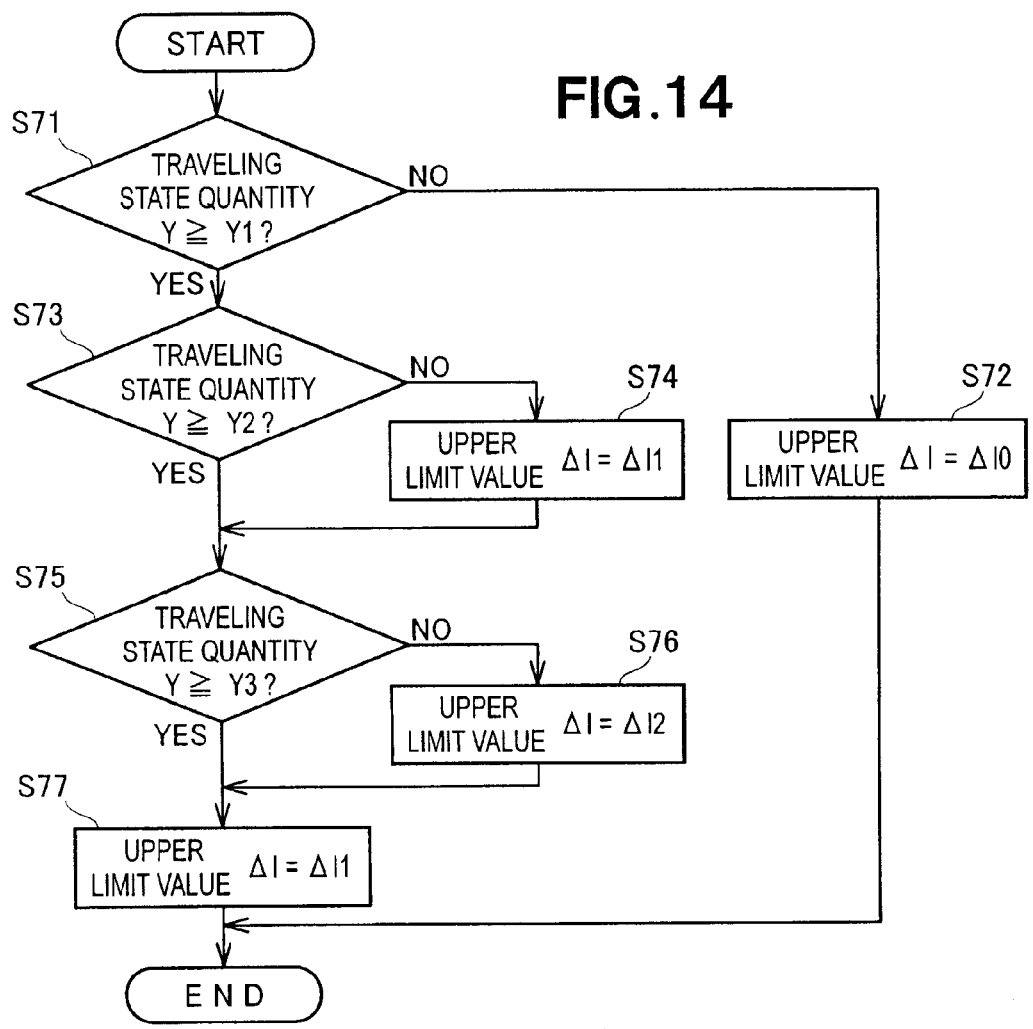
FIG. 14 is a flow chart showing a first example of a process for setting an upper limit value of a motor-energizing current supply amount variation amount.
Figure 15:
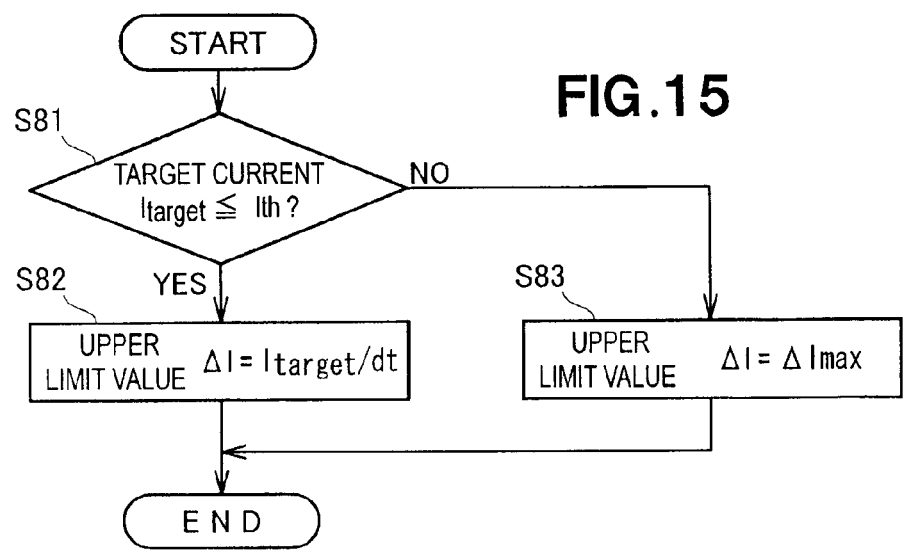
FIG. 15 is a flow chart showing a second example of the process for setting the upper limit value of the motor-energizing current supply amount variation amount.

Now, with reference to flow charts of FIGS. 13-15, the following paragraphs describe how a seat-belt pulling or payout amount is determined on the basis of the target motor-energizing current supply amount, i.e. target current $I_{target}$, determined in the aforementioned manner.

First, at step S51 of FIG. 13, a determination is made as to whether the setting of the trigger (i.e., rapid steering operation or side slip state) is valid or not. With a NO determination at step S51, the operational flow is immediately brought to an end. With a YES determination at step S51, on the other hand, the control proceeds to step S52, where the control operational sequence shown in any one of FIGS. 8-10 is executed to determine a target current $I_{target}$ of the belt-driving motor.

Note that, at step S52, a target belt take-up position $X_{target}$ may be determined instead of such a target current $I_{target}$.

Upon completion of the operation at step S52, the control moves on to step S53, where a determination is made as to whether the target current $I_{target}$ determined this time (i.e., current target current $I_{target}$) is smaller than the target current $I_{target\_old}$ determined last time (i.e., last target current $I_{target\_old}$). If the current target current $I_{target}$ is greater than the last target current $I_{target\_old}$, the control proceeds directly to step S55, while, if the current target current $I_{target}$ is smaller than the last target current $I_{target\_old}$, the control proceeds to step S55 by way of step S54. At step S54, the value of the current target current $I_{target}$ is replaced with the value of the last target current $I_{target\_old}$. By steps S53 and S54, the value of the target current is prevented from being corrected downwardly. The control arrangements shown in FIG. 13 can not only prevent the vehicle-occupant holding force of the seat belt 13 from undesirably lowering but also avoid unnecessary tension variation of the seat belt 13 so that an uncomfortable feeling of the vehicle occupant during restraint by the seat belt 13 can be significantly reduced.

Step S55 is directed to setting an upper limit value ΔI of the current supply amount variation amount. Details of step S55 are shown in the flow chart of FIG. 14 or 15 and will be later detailed.

After the upper limit value ΔI of the current supply amount variation amount is set at step S55, current-holding control is initiated at next step S56. The current-holding control is intended to hold a current to be supplied to the R-side motor 51 (or motor 23) at the target current $I_{target}$. If a motor-energizing current supply amount I detected via a current supply amount sensor is equal to the target current $I_{target}$ as determined at step S57, then the current adjustment control process is brought to an end, and the control proceeds to step S61. If, on the other hand, the detected motor-energizing current supply amount I detected via the current supply amount sensor is not equal to the target current $I_{target}$ as determined at step S57, the control goes to step S58 in order to determine which one of the detected motor-energizing current supply amount I and target current $I_{target}$ is greater than the other. If the detected motor-energizing current supply amount I is smaller than the target current $I_{target}$, a further determination is made, at step S59, as to whether a sum of the detected motor-energizing current supply amount I and upper limit value ΔI of the current supply amount variation amount (i.e., I+ΔI) is smaller than an upper limit value of the motor-energizing current supply amount $I_{upper\ limit}$. With a YES determination at step S59, the upper limit value ΔI of the current supply amount variation amount is added to the detected motor-energizing current supply amount I at step S60, after which the control proceeds to step S61. If, on the other hand, the sum of the detected motor-energizing current supply amount I and upper limit value ΔI of the current supply amount variation amount i.e., I+ΔI) is greater than the upper limit value of the motor-energizing current supply amount $I_{upper\ limit}$, the control jumps over step S60 to step S61. If the detected motor-energizing current supply amount I is greater than the target current $I_{target}$ as determined at step S58, a further determination is made, at step S62, as to whether a difference between the detected motor-energizing current supply amount I and lower limit value ΔI of the current supply amount variation amount (i.e., I−ΔI) is smaller than a lower limit value of the motor-energizing current supply amount $I_{lower\ limit}$. With a NO determination at step S62, the upper limit value ΔI of the current supply amount variation amount is subtracted from the detected motor-energizing current supply amount I at step S63, after which the control proceeds to step S61. With a YES determination at step S62, on the other hand, the control jumps over step S63 to step S61.

At step S61, a determination is made as to whether the vehicle is currently in a stable traveling state. With a YES determination at step S61, the control operational flow is brought to an end. If, on the other hand, the vehicle is currently in an unstable traveling state, the control reverts to step S52 in order to repeat the operations at and after step S52 until it is determined that the vehicle is currently in a stable traveling state.

The current-holding control is initiated at step S56 on the basis of the target current $I_{target}$ determined at step S52, so that the motor-energizing current supply amount I is adjusted to appropriately adjust a pay-out amount of the seat belt 13.

The aforementioned operations of steps S58-S60, S62 and S63 are also carried out in the case where the target belt take-up position ($X_{target}$) is used instead of the target current $I_{target}$.

Now, step S55 mentioned above will be described with reference to FIGS. 14 and 15. Control operational flow of FIG. 14 is intended to set the upper limit value ΔI of the motor-energizing current supply amount variation amount is set on the basis of a traveling state of the vehicle. "traveling state quantity" is, for example, an amount representative of a vehicle velocity, lateral acceleration, yaw rate, yaw rate offset, slip angle or the like, and the "traveling state quantity" is indicated by "Y".

The upper-limit-value setting scheme shown in FIG. 14 is designed to set the traveling state quantity Y in four stages. First, three values "Y1", "Y2" and "Y3" (Y1<Y2<Y3) are set as the traveling state quantity Y. If the traveling state quantity Y is smaller than Y1 (NO determination at step S71), the upper limit value ΔI is set at ΔI0. If the traveling state quantity Y is equal to or greater than Y1 and smaller than Y2 (YES determination at step S71 and NO determination at step S73), the upper limit value ΔI is set at ΔI1 at step S74. Further, if the traveling state quantity Y is equal to or greater than Y2 and smaller than Y3 (YES determination at step S73 and NO determination at step S75), the upper limit value ΔI is set at ΔI2 at step S76. Furthermore, if the traveling state quantity Y is equal to or greater than Y3 (YES determination at step S75), the upper limit value ΔI is set at ΔImax at step S77.

As set forth above, the upper limit value ΔI of the motor-energizing current supply amount variation amount is set, for example in four stages, at any one of ΔI0, ΔI1, ΔI2 and ΔImax in accordance with predetermined conditions. Whereas the upper limit value ΔI of the motor-energizing current supply amount variation amount has been described as being set in four stages, the present invention is not so limited, and it may be varied continuously.

The processing scheme shown in FIG. 15 is designed to set the upper limit value ΔI such that the motor-energizing current supply amount can reach the target current in a predetermined time. The processing scheme shown in FIG. 15 is generally applied to cases where the target current presents gradual variation so that it does not undesirably exceed a given value.

At step S81 in FIG. 15, a determination is made as to whether the target current $I_{target}$ is equal to or smaller than a threshold value $I_{th}$. With a YES determination at step S81, the target current $I_{target}$ is set at a value of "$I_{target}$/dt (where "dt" represents a delta time)" (step S82). If, on the other hand, the target current $I_{target}$ is greater than the threshold value $I_{th}$, the target current $I_{target}$ is set at ΔImax (step S83).

According to the processing scheme shown in FIG. 15, the upper limit value ΔI is set at the value of "$I_{target}$/dt" on condition that it does not exceed the preset target current amount, i.e. threshold value $I_{th}$, so that the motor-energizing current supply amount is allowed to reach the target current in a predetermined time.

It should be appreciated that various constructions, shapes, sizes, positions, etc. explained above in relation to the preferred embodiment are just for illustrative purposes, and that the present invention is not limited to the embodiment described above and may be modified variously without departing from the scope indicated by the appended claims.

The above-described invention can be suitably applied to optimize the belt take-up amount in such a manner that excessive tension of the seat belt does not act on the vehicle occupant during occurrence of lateral acceleration or during activation of the VSA unit, and to thereby properly restrain the vehicle occupant with an optimal holding force of the seat belt during travel of the vehicle.

Obviously, various minor changes and modifications of the present invention are possible in light of the above teaching. It is therefore to be understood that within the scope of the appended claims the invention may be practiced otherwise than as specifically described.

What is claimed is:

1. A vehicle seat belt apparatus, comprising:
   a motor for driving a belt reel having a belt wound thereon;
   a trigger configured to detect a change in a traveling state of a vehicle to output an activation signal that instructs activation of said motor;
   a lateral acceleration detector configured to detect lateral acceleration acting on the vehicle;
   a slip state detector configured to detect a slip state quantity of the vehicle; and
   a control configured to, when the activation signal output by said trigger has been received, control an amount of current supply for activating said motor on the basis of at least one of a signal of the lateral acceleration output by said lateral acceleration detector and a signal of the slip state quantity output by said slip state detector,
   wherein said control increases the amount of current supply to said motor as at least one of the lateral acceleration and the slip state quantity increases, wherein said control obtains a first current amount determined on the basis of the lateral acceleration detected via said lateral acceleration detector and a second current amount determined on the basis of the slip state quantity detected via said slip state detector, and said control determines the amount of current supply to said motor by comparing the first and second current amounts and selecting a smaller of the first and second current amounts.

2. The vehicle seat belt apparatus according to claim 1, which further comprises a rotation detector configured to detect a rotational state of the belt reel, and wherein said control controls the amount of current supply to said motor in such a manner that a belt take-up amount of the belt reel is increased, in response to a detection signal output by said rotation detector, as at least one of the lateral acceleration and the slip state quantity increases.

3. The vehicle seat belt apparatus according to claim 2, herein said control sets an upper limit value of a range of variation in the amount of current supply to said motor, and the upper limit value of the variation range varies in accordance with the traveling state of the vehicle.

4. The vehicle seat belt apparatus according to claim 2, wherein said control controls the belt take-up amount of the belt reel to vary in accordance with a turning direction of the vehicle.

5. The vehicle seat belt apparatus according to claim 4, wherein said control controls the belt take-up such that compared to that upon turning of the vehicle in an opposite direction to a positional direction of said seat, the amount of belt take-up of the belt reel upon turning of the vehicle in the same direction as the positional direction of said seat becomes larger.

6. The vehicle seat belt apparatus according to claim 1, wherein said control sets at least one of an upper limit value and a lower limit value of the amount of current supply to said motor.

7. The vehicle seat belt apparatus according to claim 1, wherein said control controls the amounts of current supply to a plurality of motors provided on left and right sides of the vehicle independently for each of the motors.

8. The vehicle seat belt apparatus according to claim 1, wherein said control controls the amount of current supply to said motor to vary in accordance with a turning direction of the vehicle.

9. The vehicle seat belt apparatus according to claim 8, wherein said control controls the current supply to said motor such that compared to that upon turning of the vehicle in an opposite direction to a positional direction of said seat, the amount of current supply to said motor upon turning of the vehicle in the same direction as the positional direction of said seat becomes larger.

10. A vehicle seat belt apparatus, comprising:
a motor for driving a belt reel having a belt wound thereon;
a trigger configured to detect a change in a traveling state of a vehicle to output an activation signal that instructs activation of said motor;
a lateral acceleration detector configured to detect lateral acceleration acting on the vehicle;
a slip state detector configured to detect a slip state quantity of the vehicle; and
a control configured to, when the activation signal output by said trigger has been received, control an amount of current supply for activating said motor on the basis of at least one of a signal of the lateral acceleration output by said lateral acceleration detector and a signal of the slip state quantity output by said slip state detector,
wherein said control obtains a first current amount determined on the basis of the lateral acceleration detected via said lateral acceleration detector and a second current amount determined on the basis of the slip state quantity detected via said slip state detector, and said control determines the amount of current supply to said motor by comparing the first and second current amounts,
wherein said control selects one of the first and second current amounts as the amount of current supply to said motor,
wherein said control determines if the selected current amount falls within a predetermined range defined by an upper current amount limit and a lower current amount limit, if the selected current amount falls within the predetermined range, the selected current amount is the amount of current supply to said motor, and if the selected current amount falls outside the predetermined range, the selected current amount is adjusted so that it falls within the predetermined range and the adjusted current amount is the amount of current supply to said motor.

11. The vehicle seat belt apparatus according to claim 10, wherein said control selects a smaller of the first and second current amounts as the amount of current supply to said motor.

* * * * *